United States Patent
Evans et al.

(10) Patent No.: US 10,077,032 B2
(45) Date of Patent: Sep. 18, 2018

(54) METHOD AND SYSTEM FOR REDUCING BRAKE DRAG

(71) Applicant: FORD GLOBAL TECHNOLOGIES, LLC, Dearborn, MI (US)

(72) Inventors: Charles K. Evans, Willis, MI (US); Tim Jurkiw, Macomb, MI (US); Dale Scott Crombez, Livonia, MI (US); Thomas Svensson, Leichlingen (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 126 days.

(21) Appl. No.: 14/475,261

(22) Filed: Sep. 2, 2014

(65) Prior Publication Data
US 2016/0059833 A1     Mar. 3, 2016

(51) Int. Cl.
*B60T 8/17*     (2006.01)
*B60T 8/88*     (2006.01)

(52) U.S. Cl.
CPC ............... *B60T 8/17* (2013.01); *B60T 8/885* (2013.01); *B60T 2270/406* (2013.01)

(58) Field of Classification Search
None
See application file for complete search history.

(56) References Cited

U.S. PATENT DOCUMENTS

| | | | |
|---|---|---|---|
| 4,428,468 A | 1/1984 | Chatterjea | |
| 5,222,787 A | 6/1993 | Eddy | |
| 5,398,923 A | 3/1995 | Perry et al. | |
| 5,471,386 A | 11/1995 | Hrovat et al. | |
| 5,630,656 A * | 5/1997 | Stewart, Jr. ............... | B60T 8/26 188/351 |
| 6,139,117 A | 10/2000 | Shirai et al. | |
| 6,161,074 A | 12/2000 | Sielagoski et al. | |
| 6,286,635 B1 | 9/2001 | Tamor | |
| 6,370,466 B1 | 4/2002 | Hada et al. | |
| 6,502,014 B1 | 12/2002 | Herrmann et al. | |
| 6,913,326 B1 * | 7/2005 | Ohkubo ................... | B60T 7/122 303/11 |
| 7,627,415 B2 | 12/2009 | Tschernoster et al. | |
| 8,397,880 B2 | 3/2013 | Chelaidite | |

(Continued)

FOREIGN PATENT DOCUMENTS

| | | |
|---|---|---|
| DE | 102007030780 A1 | 1/2009 |
| EP | 2 511 146 A2 | 10/2012 |
| WO | WO 2012/055911 A2 | 5/2012 |

OTHER PUBLICATIONS

Tadashi Tamasho et al., "Technique for Reducing Brake Drag Torque in the Non-Braking Mode".

(Continued)

*Primary Examiner* — Nicholas K Wiltey
(74) *Attorney, Agent, or Firm* — Jones Robb, PLLC; Frank MacKenzie

(57) ABSTRACT

Systems and methods are described for reducing brake drag in a brake system of a vehicle. It may be determined that the vehicle is stationary. A brake pressure of the brake system may be monitored. The monitored brake pressure may then be compared to a brake pressure criteria. A brake pressure to be applied may be regulated when the monitored brake pressure does not meet the brake pressure criteria, wherein the applied brake pressure meets the pressure criteria.

19 Claims, 4 Drawing Sheets

(56) References Cited

U.S. PATENT DOCUMENTS

| | | |
|---|---|---|
| 2002/0193931 A1 | 12/2002 | Walenty et al. |
| 2003/0085576 A1 | 5/2003 | Kuang et al. |
| 2004/0113489 A1 | 6/2004 | Iwagawa et al. |
| 2006/0106520 A1 | 5/2006 | Bodin et al. |
| 2006/0123776 A1* | 6/2006 | Viswanathan ........ B60T 13/145 60/413 |
| 2010/0211281 A1 | 8/2010 | Baier-Welt et al. |
| 2010/0308645 A1* | 12/2010 | Maron .................. B60T 13/588 303/20 |
| 2012/0139328 A1 | 6/2012 | Brown et al. |
| 2014/0058639 A1* | 2/2014 | Svensson .................. B60T 8/17 701/70 |

OTHER PUBLICATIONS

Non-Final Office Action dated Jan. 5, 2015, in U.S. Appl. No. 13/943,994.
Final Office Action dated Aug. 4, 2015, in U.S. Appl. No. 13/943,994.
Notice of Allowance dated Dec. 9, 2015, in U.S. Appl. No. 13/943,994.
Non-Final Office Action dated Sep. 30, 2016, in U.S. Appl. No. 13/943,994.
Final Office Action dated May 4, 2017, in U.S. Appl. No. 13/943,994.
Office Action in DE Appln No. 10 2012 214 805.1 dated Apr. 10, 2013.
Notification of First Office Action in CN Appln No. 201310365524.6 dated Dec. 5, 2016.
Non Final Office Action in co-pending U.S. Appl. No. 13/943,994 dated Oct. 12, 2017.

* cited by examiner

METHOD AND SYSTEM FOR REDUCING BRAKE DRAG

RELATED APPLICATION

This application is related to U.S. patent application Ser. No. 13/943,994 (published as U.S. Patent Pub. Num. 2014/0058639), filed on Jul. 17, 2013, the entire content of which is incorporated by reference herein.

TECHNICAL FIELD

The present disclosure relates generally to a method and apparatus for reducing brake drag and to a vehicle for carrying out the method of the disclosure.

INTRODUCTION

The brake systems in modern vehicles comprise a number of moving parts, and it can be beneficial to ensure that the brake system functions properly while not negatively impacting vehicle motion. For example, a brake system may comprise a number of brake pads and brake disks. The brake disks may be fixed to rotate with the wheels of the vehicle. Accordingly, it can be beneficial to minimize the frictional force that the brake pads apply to the brake disks, and subsequently to the wheels, during certain normal driving situations (e.g., vehicle operation when the brake pedal has been released after having been depressed). Such friction (drag) adversely affects fuel economy and may shorten the life span of brake system components such as brake pads and rotors.

SUMMARY

In accordance with various exemplary embodiments, the present disclosure provides systems and methods for reducing brake drag in a brake system of a vehicle. It may be determined that the vehicle is stationary. A brake pressure of the brake system may be monitored. The monitored brake pressure may then be compared to a brake pressure criteria. A brake pressure to be applied may be regulated when the monitored brake pressure does not meet the brake pressure criteria, wherein the applied brake pressure meets the pressure criteria.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein.

Figure 1:
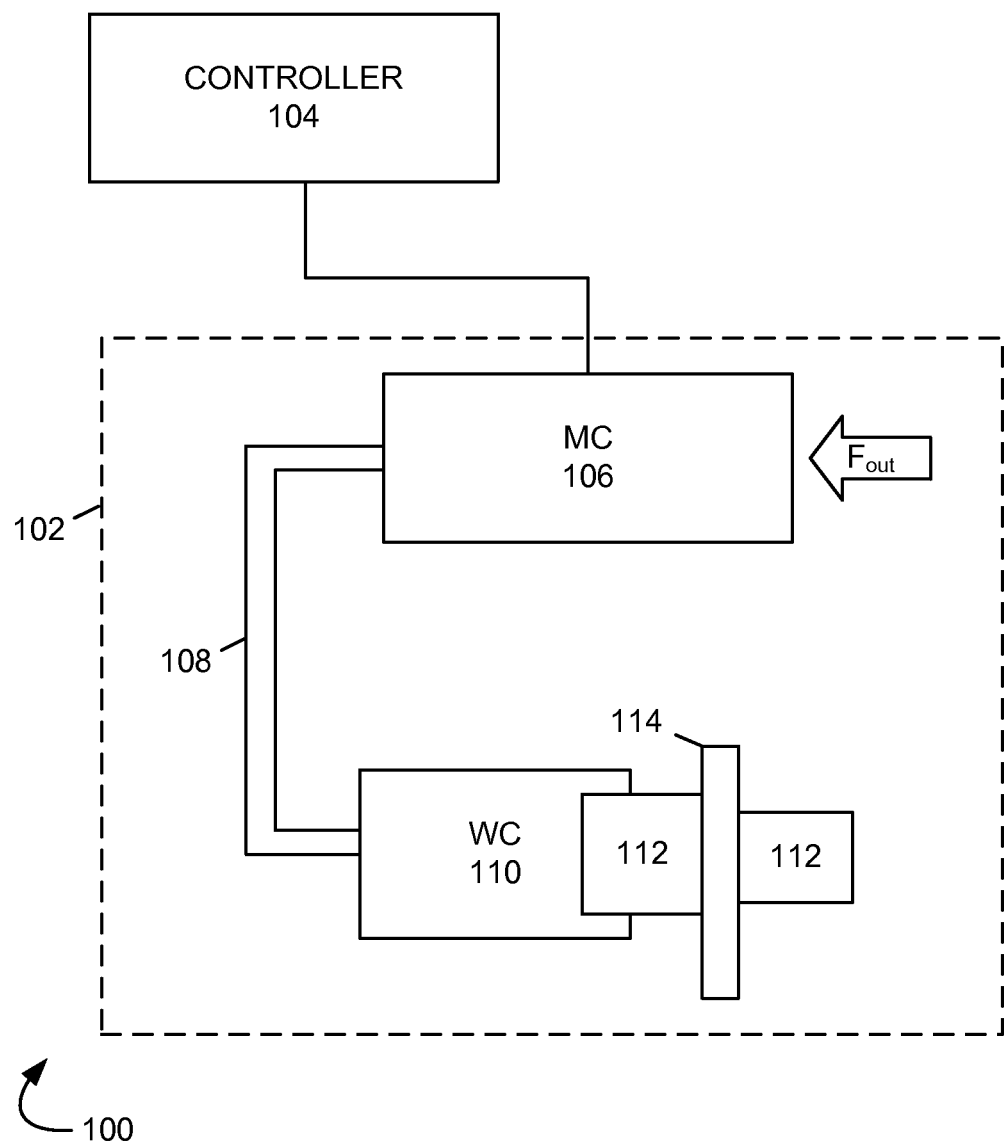
FIG. 1 is a schematic illustration of an apparatus for reducing brake drag in accordance with the present teachings.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure.

The disclosure provides a method and system for reducing brake drag. In accordance with the present teachings, an exemplary embodiment may include a vehicle that comprises a brake system with multiple sets of brake pads and brake disks. The brake system may reduce the speed of a vehicle using frictional force caused by friction between a brake pad and a brake disk. In certain circumstances, during normal vehicle operation when the brake system is not engaged (e.g., when a brake pedal of the vehicle is not depressed), frictional force between the brake pad and the brake disk may slow the velocity of the vehicle. This frictional force may be referred to as brake drag.

In addition, excess braking pressure can lead to residual brake drag. When the driver applies a high level of braking force, brake system pressure does not immediately go to zero when the driver releases the pedal. Because of that pressure, the brake pads or shoes maintain contact with the disk or drum during the time required for the pressure to fall off. It can readily be seen that this effect produces a number of negative results, including excess fuel consumption and emissions required to overcome that drag, and excess brake wear produced by that drag.

In accordance with the present teachings, in an exemplary embodiment of a system a controller may be used for reducing brake drag caused by the brake system of a vehicle. For example, the controller may regulate a brake pressure within the brake system in a manner that reduces brake drag (e.g., brake drag during vehicle motion). The controller may first determine whether the vehicle is stationary. The controller may then monitor a brake pressure from a sensor of the brake system (e.g., master cylinder pressure, wheel cylinder pressure, brake pedal pressure, or the like). The controller may then regulate the applied brake pressure such that brake drag on the vehicle is reduced.

In accordance with the present teachings, in an exemplary embodiment the controller may compare the monitored pressure to a criteria, and regulate the applied brake pressure when the monitored pressure fails to meet the criteria. For example, the criteria may comprise a brake pressure range, and the controller may regulate the applied pressure such that it falls within the brake pressure range.

FIG. 1 depicts a vehicle that may carry out the method according to an embodiment of the disclosure. Vehicle 100 may comprise a brake system 102 (e.g., partially illustrated in FIG. 1). The brake system may comprise a brake pedal (not shown) and a master cylinder 106. In accordance with the present teachings, in an exemplary embodiment of the method a brake pedal may be engaged (e.g., by the driver) such that a force is applied to the master cylinder 106. The master cylinder 106 contains brake fluid and the force that acts upon the cylinder compresses the brake fluid (e.g., by shrinking the volume of the portion of the master cylinder that houses the brake fluid) and, thus, increases the master cylinder pressure.

Brake system 102 may further comprise brake lines 108 and a plurality of wheel cylinders 110, such that a brake line 108 couples master cylinder 106 to a wheel cylinder 110. Each wheel cylinder 110 is associated with a corresponding wheel and brake disk. For purposes of modeling, the present disclosure utilizes a single circuit model that relies on a single brake line 108 and corresponding wheel cylinder 110, as shown. It should be understood that the use of the single circuit is for purposes of modeling only and the method as disclosed herein is equally applicable to brake systems comprising multiple circuits. The increased pressure in master cylinder 106 displaces the brake fluid and causes the brake fluid to flow into wheel cylinder 110 via brake line 108. Accordingly, wheel cylinder 110 experiences an increased pressure.

Brake system 102 includes brake pad(s) 112, brake disk(s) 114. A force is applied to brake pad 112 based on the increased pressure in wheel cylinder 110. Brake pad 112 then presses against disk 114 causing a frictional force that slows the rotation of a wheel. Accordingly, the brake system may be used to decelerate vehicle 100.

In accordance with the present teachings, in an exemplary embodiment controller 104 may be used to reduce brake drag caused by brake system 102. Controller 104 may form one part of the hardware of a control system, and may be a microprocessor based device that includes a central processing unit (CPU) for processing incoming signals from known source. Controller 104 may be provided with volatile memory units, such as a RAM and/or ROM that function along with associated input and output buses. Further, controller 104 may also be optionally configured as an application specific integrated circuit, or may be formed through other logic devices that are well known to the skilled in the art. Controller 104 either may be formed as a portion of an existing electronic control unit, or may be configured as a stand-alone entity.

In accordance with the present teachings, in an exemplary embodiment, when the brake pedal is depressed, controller 104 may determine whether the vehicle is stationary. For example, controller 104 may receive a sensed vehicle velocity from an accelerometer (or some other acceleration or velocity sensor). Subsequent to depression of the brake pedal and the controller receiving an indication that the brake pedal has been depressed, mastery cylinder 106 may experience a change in brake fluid pressure, and a pressure sensor (not depicted) may sense the pressure of master cylinder 106. In an embodiment, a sensor (not depicted) may detect the brake pedal position when the brake pedal is engaged and further determine a master cylinder pressure based on the brake pedal position. Additionally or alternatively, a wheel cylinder pressure may be sensed by a sensor or may be determined (e.g., based on the master cylinder pressure or the brake pedal position or by other means known in the art). Controller 104 may receive a monitored brake pressure (e.g., master cylinder pressure or wheel cylinder pressure) and compare it to a criteria. When the brake pressure fails to meet the criteria, controller 104 may regulate an applied brake pressure for brake system 102.

Figure 2:
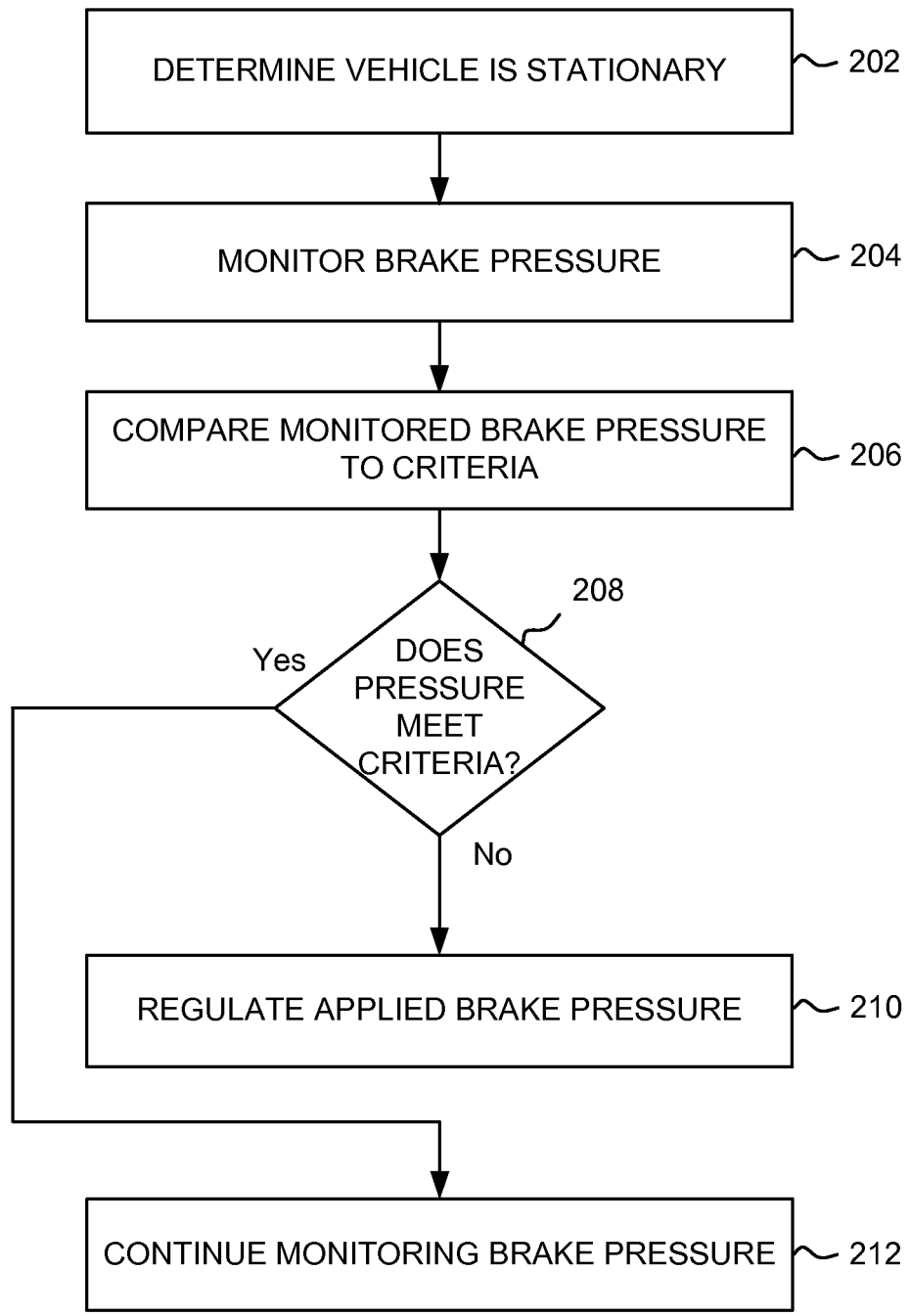
FIG. 2 is a flowchart of an exemplary method for reducing brake drag in accordance with the present teachings.

FIG. 2 illustrates a method for determining the effectiveness of a brake system in accordance with an exemplary embodiment of the disclosure. In accordance with the present teachings, an exemplary embodiment of the method begins with determining that the vehicle is stationary at step at step 202. For example, controller 104 may receive a sensed vehicle velocity from an accelerometer (or some other acceleration or velocity sensor). In an embodiment, controller 104 may determine that the vehicle is stationary in any suitable manner. Because brake drag can be significantly affected by applied brake pressure when a vehicle is stationary, the determination that the vehicle is stationary triggers the method to monitor brake pressure for the vehicle.

At step 204, a brake pressure for the vehicle may be monitored. For example, a master cylinder pressure and/or wheel cylinder pressure may be monitored for master cylinder 106 and/or wheel cylinder 110. In an embodiment, one or more sensors may be used to sense the brake pressure. In another embodiment, a sensor may be used to detect the position of the brake pedal, and a master cylinder pressure and/or wheel cylinder pressure may be determined based on the detected brake pedal position. Here, the brake pressure (e.g., master cylinder pressure or wheel cylinder pressure) may be monitored at controller 104. In an alternative embodiment, the brake position may be monitored at controller 104, and a brake pressure may be determined based on the brake position. Additionally or alternatively, one of the master cylinder pressure or wheel cylinder pressure may be monitored at controller 104, and the other pressure value may be determined based on the monitored pressure value.

At step 206, the monitored brake pressure may be compared to a criteria. In accordance with the present teachings, in an exemplary embodiment the criteria may comprise a brake pressure range (e.g., a brake pressure ceiling and a brake pressure floor). Controller 104 may compare the monitored brake pressure to the criteria to determine whether the monitored brake pressure falls within a desired brake pressure range. In accordance with an embodiment, the criteria may be based on one or more of a caliper geometry for the brake system, a rotor geometry for disk 114, a brake pad geometry for brake pad(s) 112, and a brake pad grade for brake pad(s) 112.

In accordance with the present teachings, in an exemplary embodiment the maximum value of the brake pressure range of the criteria (e.g., brake pressure ceiling) may comprise a drag knee point. A drag knee point may comprise a point at which an increase in brake pressure produces a relatively large increase in brake drag. Thus, after reaching the drag-knee point 1106, increases in brake pressure may produce excess increases in brake drag, and subsequently produce substantial brake wear and undesired frictional force. The drag knee point for vehicle 100 may be determined based on experimental results. For example, a vehicle similar to vehicle 100 may be tested such that a monitored brake pressure is compared to a subsequent brake drag. The drag knee point may be based on the vehicle type for vehicle 100 and the brake pad type for brake pad 112. For example, the drag knee point may be based on one or more of a caliper geometry for the brake system, a rotor geometry for disk 114, a brake pad geometry for brake pad 112, and a brake pad grade for brake pad 112. The experimental data may be analyzed to determine the drag knee point.

Figure 4:
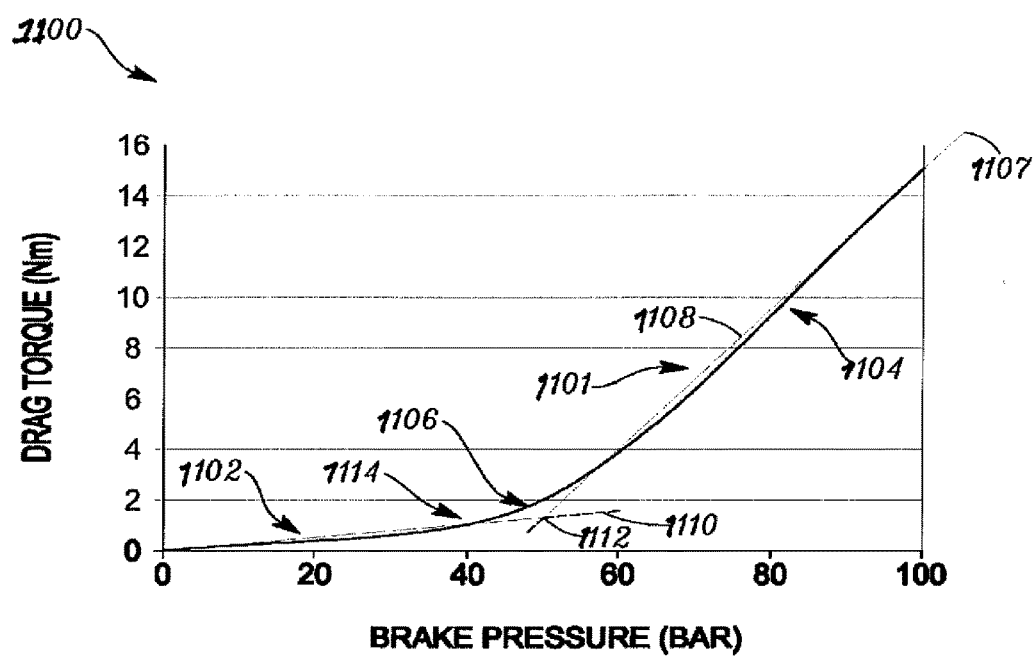
FIG. 4 is a graphical representation that defines brake pressure vs. drag torque in a vehicular brake system.

Turning to FIG. 4, a substantially detailed graphical preview of the relation between the brake's drag torque and the applied brake pressure is laid out. As noted above, that relation establishes the drag-knee point. For ease of reference, the term 'drag torque' will be employed interchangeably with 'frictional torque'.

In the chart 1100 of FIG. 4, the X-axis represents the brake pressure in bar, while the Y-axis represents drag torque or frictional torque 1 in Nm, plotted as a curve 1101. The curve includes a generally flat portion 1102 and a steeper portion 1104, and the inflection point between those portions defines the drag-knee point 1106. In terms of mechanical effect, drag knee point 1106 identifies the point at which a small increase in brake pressure produces a relatively large increase in drag torque. Thus, after reaching the drag-knee point 1106 any increase in brake pressure will produce large increases in drag torque, producing substantial brake wear. Maximum system pressure is identified by point 1107.

To identify the drag-knee point 1106, the controller 104 may superimpose compensation best-fit straight lines 1108 and 1110, respectively, on the portions 1104 and 1102. The intersection of those lines at a point 1112 may be superimposed to the curve 1101 to identify the drag-knee point 1106.

The drag-knee point 1106 can be defined in terms of a single point 1106, or a range of points corresponding to the transition from the curve's relatively flat portion 1102 to relatively steep portion 1104. Determining the configuration of a particular system, the transition portion can be defined in terms of the curve slope or in absolute terms, as will be understood by those of ordinary skill in the art. Once the drag-knee point 1106 is established, the minimum brake pressure (predefined limiting value) can be extracted from those values. Alternatively, an average of multiple values that fall at the intermediate section 1114 could be contemplated as well.

It will be readily understood that drag-knee point 1106 will not be identical for all vehicles. Taking into account factors such as vehicle weight, brake design, and the like, particular service brake systems must be analyzed to produce individual characteristic curve 1101.

In accordance with the present teachings, in an exemplary embodiment the minimum value of the brake pressure range of the criteria (e.g., brake pressure floor) may comprise a threshold point. A threshold point may comprise a point at which a decrease in brake pressure produces an increase in brake drag. Thus, falling below the threshold point brake pressure may produce excess increases in brake drag, and subsequently produce substantial brake wear and undesired deceleration. The threshold point for vehicle 100 may be determined based on experimental results. For example, a vehicle similar to vehicle 100 may be tested such that a monitored brake pressure is compared to a subsequent brake drag. The threshold point may be based on the vehicle type for vehicle 100 and the brake pad type for brake pad 112. For example, the threshold point may be based on one or more of a caliper geometry for the brake system, a rotor geometry for disk 114, a brake pad geometry for brake pad 112, and a brake pad grade for brake pad 112. The experimental data may be analyzed to determine the threshold point.

In accordance with the present teachings, in an exemplary embodiment the threshold point may be greater than a minimum brake pressure required for the vehicle to remain stationary. For example, a minimum brake pressure may be calculated for vehicle 100 to remain stationary. The threshold point may be greater than the minimum brake pressure required for the vehicle 100 to remain stationary, as determined using experimental testing.

Figure 3:
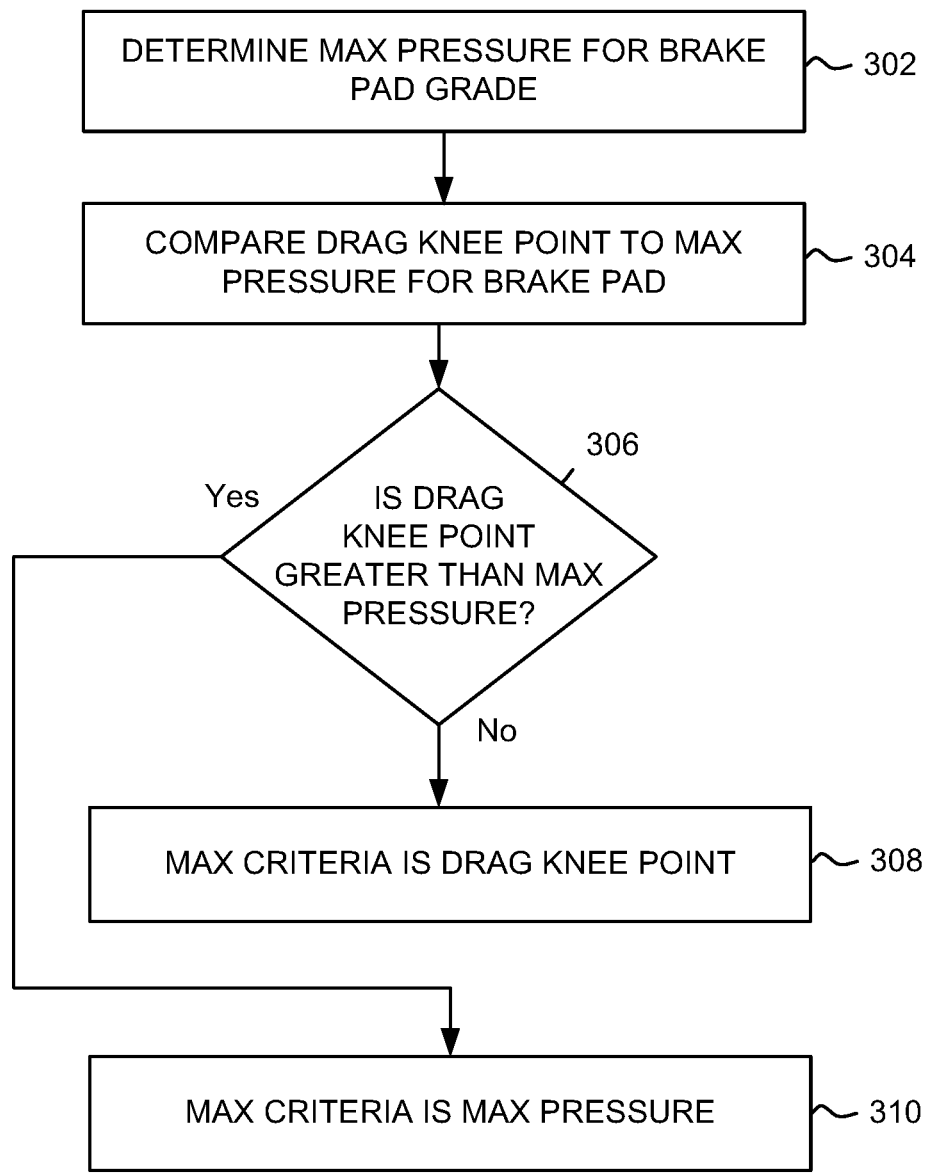
FIG. 3 is a flowchart of an exemplary method for determining a brake pressure criteria in accordance with the present teachings.

In accordance with the present teachings, in an exemplary embodiment the criteria may be based on one or more specifications for the brake system. In an example, a sample drag knee point may comprise 35 bars of brake pressure and a sample threshold point may comprise 25 bars of brake pressure (e.g., wheel cylinder pressure). FIG. 3 further describers the criteria.

At step 208, it may be determined whether the monitored brake pressure meets the criteria. For example, controller 104 may compare the monitored brake pressure to the criteria to determine whether the monitored brake pressure falls within the brake pressure range of the criteria. When the brake pressure does not fall within the range of the criteria, the method may progress to step 210. For example, when the monitored brake pressure exceeds the maximum brake pressure of the criteria (e.g., ceiling brake pressure) or falls below the minimum brake pressure of the criteria (e.g., floor brake pressure), the method may progress to step 210.

At step 210, the applied brake pressure may be regulated. For example, where the monitored brake pressure exceeds the maximum brake pressure criteria, the applied brake pressure may be limited to the maximum brake pressure criteria. In another example, where the monitored brake pressure falls below the minimum brake pressure criteria, the applied brake pressure may be increased to the minimum brake pressure criteria. In an embodiment, the applied brake pressure may be regulated when the monitored brake pressure approaches (e.g., is within a threshold value from) the maximum brake pressure or minimum brake pressure.

In accordance with the present teachings, in an exemplary embodiment the applied brake pressure may comprise master cylinder pressure or wheel cylinder pressure. A number of methods are available to those in the art for regulating an applied brake pressure. For example, a valve or pressure regulator may be used to limit an applied brake pressure to a maximum brake pressure. Such devices are well known in the art, and they have the effect of establishing a maximum pressure level for the system. For example, a valve or regulator may redirect a portion of the brake fluid flow to the master cylinder (e.g., from the wheel cylinder) or to another system component, leaving only a portion of the fluid flow sufficient to produce a brake pressure less than the maximum brake pressure.

In an embodiment, a pressure assist portion of the brake system (not shown) may be used to raise the applied brake pressure to the minimum brake pressure. A pressure assist system may be used to amplify brake force applied by the driver, and controller 104 may instruct the pressure assist system to raise the applied brake pressure to the minimum brake pressure. In another embodiment, an electric motor that drives a pump may be used to increase the brake pressure. For example, when brake pressure falls below (or approaches) the minimum brake pressure an electric motor may be triggered that drives a pump which pumps brake fluid into the wheel cylinder and, therefore, increases brake pressure.

Alternatively, when the brake pressure falls within the range of the criteria, the method may progress to step 212. For example, when the monitored brake pressure does not exceed the maximum brake pressure of the criteria (e.g., ceiling brake pressure) or fall below the minimum brake pressure of the criteria (e.g., floor brake pressure), the method may progress to step 212. At step 212, the brake pressure (e.g., master cylinder pressure or wheel cylinder pressure) may continue to be monitored.

FIG. 3 illustrates determining a brake pressure criteria in accordance with an exemplary embodiment of the disclosure. For example, the criteria utilized by the method of FIG. 2 may be determined using the method of FIG. 3. In accordance with the present teachings, an exemplary embodiment of the method begins at step 302 with determining a maximum pressure for the brake pads of the brake system. For example, brake pad(s) 112 may comprise a type of brake pad with a particular geometry, a particular manufacture material, and a particular grade. A maximum pressure may be determined for brake pad(s) 112 based on the brake pad type. The maximum pressure may be determined using experimental results, or brake pad(s) 112 may comprise a suggested maximum pressure.

At step 304, the drag knee point for the vehicle may be compared to the maximum pressure for the brake pad. For example, the drag knee point for vehicle 100 may be compared to the maximum pressure for brake pad(s) 112. At step 306, it may be determined whether the drag knee point is greater than the maximum pressure for the brake pads. When the drag knee point is less than the maximum pressure for the brake pads, the method may progress to step 308, where the maximum brake pressure (e.g., ceiling brake pressure) for the criteria may comprise the drag knee point. When the drag knee point is greater than the maximum pressure for the brake pads, the method may progress to step 310, where the maximum brake pressure (e.g., ceiling brake pressure) for the criteria may comprise the maximum pressure for the brake pads.

The methods illustrated in FIGS. 2 and 3 can be performed in one or more devices of system 100. For example, the method can be performed by controller 104, or any outer suitable device. Controller 104 can include a storage element such as a disk drive, flash drive, memory circuit, or other memory device. The storage element can store software which can be used in operation of the control device. Software can include computer programs, firmware, or some other form of machine-readable instructions, including an operating system, utilities, drivers, network interfaces, applications, and the like. Controller 104 can further include a processing element such as a microprocessor or other circuitry to retrieve and execute software from the storage element. Controller 104 can also comprise other components such as a power management unit, a control interface unit, etc.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices.

While the present disclosure has been disclosed in terms of exemplary embodiments in order to facilitate better understanding of the present disclosure, it should be appreciated that the present disclosure can be embodied in various ways without departing from the principle of the disclosure. Therefore, the present disclosure should be understood to include all possible embodiments which can be embodied without departing from the principle of the disclosure set out in the appended claims.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. Other embodiments of the disclosure will be apparent to those skilled in the art from consideration of the specification and practice of the disclosure disclosed herein. It is intended that the specification and embodiment described herein be considered as exemplary only.

What is claimed is:

1. A method for reducing brake drag, comprising:
   determining a ceiling of a brake pressure criteria by:
   comparing a maximum brake pressure to a drag knee point for the vehicle, wherein the drag knee point represents a brake pressure above which increases in brake drag are relatively large for the vehicle, and
   setting the ceiling of the brake pressure criteria to the drag knee point when the drag knee point is lower than the maximum brake pressure;
   determining that a vehicle is stationary;
   monitoring brake pressure of a brake system of the vehicle;
   comparing the monitored brake pressure to the brake pressure criteria; and
   when the monitored brake pressure does not meet the brake pressure criteria, regulating current brake pressure to satisfy the brake pressure criteria.

2. The method of claim 1, wherein the brake pressure criteria further comprises a brake pressure floor.

3. The method of claim 2, wherein the brake pressure floor is greater than a minimum brake pressure required for the vehicle to remain stationary.

4. The method of claim 3, wherein the brake pressure floor is based on vehicle characteristics of the vehicle and brake pad characteristics of the brake system.

5. The method of claim 1, wherein the drag knee point is based on at least one of a vehicle type, a vehicle weight, and a brake pad type.

6. The method of claim 1, wherein the brake pressure criteria is based on one or more of a caliper geometry for the brake system, a rotor geometry for the brake system, a brake pad geometry for the brake system, and a brake pad grade for the brake system.

7. The method of claim 1, wherein the monitored brake pressure comprises one of master cylinder pressure of the brake system or wheel cylinder pressure of the brake system.

8. The method of claim 1, wherein the regulated current pressure comprises one of a master cylinder pressure of the brake system and a wheel cylinder pressure of the brake system.

9. A system for reducing brake drag in a brake system of a vehicle, comprising:
 a vehicle controller, the controller being configured to:
  determine a ceiling of a brake pressure criteria by:
   comparing a maximum brake pressure to a drag knee point for the vehicle, wherein the drag knee point represents a brake pressure above which increases in brake drag are relatively large for the vehicle, and
   setting the ceiling of the brake pressure criteria to the drag knee point when the drag knee point is lower than the maximum brake pressure;
  determine that the vehicle is stationary;
  monitor brake pressure of the brake system of the vehicle;
  compare the monitored brake pressure to the brake pressure criteria; and
  regulate current brake pressure to satisfy the brake pressure criteria when the monitored brake pressure does not meet the brake pressure criteria.

10. The system of claim 9, wherein the brake pressure criteria further comprises a brake pressure floor.

11. The system of claim 10, wherein the drag knee point is based on at least one of a vehicle type, a vehicle weight, and a brake pad type.

12. The method of claim 10, wherein the brake pressure floor is greater than a minimum brake pressure required for the vehicle to remain stationary.

13. The system of claim 12, wherein the brake pressure floor is based on vehicle characteristics of the vehicle and brake pad characteristics of the brake system.

14. The system of claim 9, wherein the brake pressure criteria is based on one or more of a caliper geometry for the brake system, a rotor geometry for the brake system, a brake pad geometry for the brake system, and a brake pad grade for the brake system.

15. The system of claim 9, wherein the monitored brake pressure comprises one of master cylinder pressure of the brake system or wheel cylinder pressure of the brake system.

16. The system of claim 9, wherein the regulated current pressure comprises one of a master cylinder pressure of the brake system and a wheel cylinder pressure of the brake system.

17. A method for reducing brake drag in a vehicle accelerating from a stationary position, comprising:
 comparing a ceiling of a predetermined brake pressure range to a drag knee point, which represents a brake pressure above which increases in brake drag are relatively large for the vehicle, wherein the range is selected to limit brake drag for the vehicle;
 when the ceiling is greater than the drag knee point, setting the ceiling to the drag knee point; and
 when a current pressure does not meet the brake pressure range, regulating the current pressure to fall within the brake pressure range.

18. The method of claim 17, wherein the predetermined brake pressure range further comprises a brake pressure floor.

19. The method of claim 18, wherein the brake pressure floor is greater than a minimum brake pressure required for the vehicle to remain stationary.

* * * * *